United States Patent [19]

Bonner

[11] Patent Number: 5,498,439
[45] Date of Patent: Mar. 12, 1996

[54] PROCESS FOR ENCAPSULATING THE FLAVOR WITH COLLOID GEL MATRIX

[75] Inventor: Michael J. Bonner, Westfield, N.J.

[73] Assignee: Arnhem, Inc., Cranford, N.J.

[21] Appl. No.: 361,445

[22] Filed: Dec. 21, 1994

Related U.S. Application Data

[63] Continuation of Ser. No. 208,894, Mar. 4, 1994, abandoned.

[51] Int. Cl.⁶ .......................... A23L 1/221; A23L 1/222; A23L 1/05; A23L 1/318
[52] U.S. Cl. .................. 426/650; 426/651; 426/573; 426/574; 426/575; 426/576; 426/577; 426/578
[58] Field of Search .................................. 426/650–651, 426/573–578

[56] References Cited

U.S. PATENT DOCUMENTS

| | | |
|---|---|---|
| 1,388,174 | 8/1921 | Denny . |
| 2,369,847 | 2/1945 | Olsen et al. . |
| 3,867,556 | 2/1975 | Darraugh et al. . |
| 3,957,964 | 5/1976 | Grimm, III . |
| 3,962,463 | 6/1976 | Ditzel . |
| 4,590,075 | 5/1986 | Wei et al. . |
| 4,610,890 | 9/1986 | Miller et al. . |
| 5,009,900 | 4/1991 | Levine et al. . |
| 5,064,669 | 11/1991 | Tan et al. . |
| 5,114,735 | 5/1992 | Rua, Jr. et al. . |
| 5,126,151 | 6/1992 | Bodor et al. . |
| 5,221,502 | 6/1993 | Washington . |
| 5,266,335 | 11/1993 | Cherukuri et al. . |

FOREIGN PATENT DOCUMENTS

| | | |
|---|---|---|
| 0170752 | 12/1984 | European Pat. Off. . |
| 0252374 | 6/1987 | European Pat. Off. . |
| 0489207 | 12/1990 | European Pat. Off. . |

OTHER PUBLICATIONS

Okuno JPO Patent (Abstract only) 62–184203 (May, 1989).

*Primary Examiner*—Donald E. Czaja
*Assistant Examiner*—Choon P. Koh
*Attorney, Agent, or Firm*—Shoemaker & Mattare, Ltd.

[57] ABSTRACT

A stable liquid suspension of an encapsulated flavor oil, oleoresin or spice in a gel matrix is prepared by forming a gel matrix with high shear mixing of a colloidal gelling agent at a temperature of about 15° C., and dispersing the encapsulated flavor oil, oleoresin or spice in the gel matrix during the formation of the gel matrix.

7 Claims, No Drawings

1

PROCESS FOR ENCAPSULATING THE FLAVOR WITH COLLOID GEL MATRIX

This application is a continuation of application Ser. No. 08/208,894, filed Mar. 4, 1994, now abandoned.

FIELD OF THE INVENTION

The present invention relates to methods of encapsulating flavor oil, oleoresin, spice, color, food chemical ingredients or other chemicals and additives in a colloid gel matrix for use in various food products. More particularly, the invention relates to improving the flavor of food products by incorporation of the encapsulated additives in a gel matrix which protects the additives from deterioration or oxidation or flavor loss during the manufacturing process. Further, the present invention provided a method for preparing spice flavors in a liquid form which can be employed in place of dry spices in the food system being processed.

BACKGROUND OF THE INVENTION

Encapsulation is used to protect the core materials, such as flavor oil, oleoresin, spice, chemicals and colorants in food processing operations. The technologies generally employed are coating, spray drying, extrusion and coacervation. Finished products are normally in the solid form and can be different in mesh size. The applications of encapsulated materials in food industry are, however, limited to only specific areas. Some examples are encapsulated vitamins and minerals. Incorporating dry encapsulated products in food products often produce uneven distribution of core materials. The high cost normally associated with the encapsulation process also limits the usage of encapsulated products in the food industry.

Spice, oleoresin, flavor oil, color or chemicals are typically added during food processing to produce the desirable flavors, taste and appearance. Oleoresin and flavor oil are coated on carriers, such as salt and dextrose, and mixed with other dry food ingredients before they are used for food production. Because of the exposure of these additives to light and oxygen, the carrier coated oleoresin and flavor oils which are susceptible to oxidation often lose the desired flavor value very quickly. Oleoresin and flavor oils can be added directly into the food production, however, distribution uniformly in the food system is very difficult. This is because of the hydrophobic nature of oleoresin and flavor oil. Several oleoresin and spice producers have used surfactants and emulsifiers to facilitate the distribution of the oleoresin. These approaches have not been effective because the surfactant added in the emulsion system of oleoresin may not be adequate for proper distribution when they are used in different food systems. Therefore, most food manufacturers coat the oleoresin and flavor oils on carriers before they are used. This can limit the shelf life of the oleoresin and flavor oil, and pose the significant problem in production scheduling.

Oleoresin and flavors are encapsulated by various technologies. Two recent inventions are used as examples to demonstrate the state of the art. Heat-stable and fracturable, spray-dried, free-flowing flavor oil capsules having a coating of gelatin, carboxymethyl cellulose, gum arabic, casein and alginate, and mixture of the above are described in WO 93/19622. This publication describes the art of crosslinking of gelatin with dialdehyde compounds to form a complete coating envelope for the core materials. The core materials are protected throughout the food processing. Core materials are released when coating materials are fractured by physical force, e.g., when the product is consumed.

In published European patent applications EP 455598 and EP 401954, flavor oils have been encapsulated in the form of coacervated microcapsules, which comprise a core of flavor oil and a coating layer around the core. The coating layer is prepared by coacervation which is a process for the aggregation of colloidal spheres held together by electrostatic forces. In complex coacervation, the aggregation of colloidal spheres is a mixture of two or more oppositely charged hydrophilic colloidal materials of both cationic and anionic types. Coacervation to uniformly distribute the colloidal materials around the flavor oil droplets, is then carried out by diluting an emulsion of the flavor oil in the presence of such colloidal materials with water, adjusting the pH of the emulsion or the temperature, or by any combination of such techniques.

Spice and food ingredients are added in dry form into the raw food ingredients during normal processing. The addition of dry ingredients in the process is time consuming and labor intensive. This poses the problem of continuous operation in the industry, especially for the small or medium size companies. Spice manufacturers have attempted to convert the dry spice operation into liquid spice. However, it is not successful because the phase separation and sedimentation of some of the spices occurred when spice is mixed with the water.

While many improvements have been made in the encapsulation and liquid spice production, further improvements are needed to reduce the costs of production of the encapsulation process. Also, uniformly distributed spices in the liquid medium would be beneficial for the food manufacturers. These improvements would make continuous manufacturing processes possible for products that need dry spices or the described ingredients in the formulation.

OBJECTS OF THE INVENTION

It is therefore an object of the present invention to develop a method that can encapsulate the flavor oil, chemicals, oleoresin and spice in a gel with good stability, which can be distributed into the food system uniformly.

It is another object of the present invention to develop a process that is flexible enough to encapsulate a wide variety of food ingredients in the processed food system.

It is yet another object of the present invention to develop a process that can convert spice into a liquid form with good uniformity that can be pumped into the food system directly.

It is a further object to develop a method to convert the encapsulated food ingredients into a stable bulking materials with unique viscoelastic property for food product.

BRIEF DESCRIPTION OF THE INVENTION

In accordance with the present invention, a process is provided for encapsulating the flavor oils, oleoresin, spice and spice in a colloid gel. This colloid gel can be used directly in the food system or further processed and then incorporated in the food system. Until now, no technology is available for simply and economically encapsulating the flavors, oleoresin and spice essence that delivers uniform encapsulated products into the food system.

Briefly, a colloid gel is made from water and animal protein polymers or plant polysaccharide or other polymers that can form a stable gel under the specific temperature, concentration and processing condition. Preferably, more than one type of polymer is used to improve the colloid gels, viscoelastic, physical and chemical properties to insure a complete encapsulation. Spice and flavor components, such as oleoresin and flavor oils are added in a prescribed procedure and quantity to the colloid gel. The product is mixed with high shear pressure to create a stable colloid gel matrix. The core materials, such as flavor oils and spices, are encapsulated in the colloidal gel matrix by their hydrophobic and hydrophilic properties. The encapsulated core materials, i.e., spices, oleoresin, flavor oils, in a very small globule form is trapped in the colloid gel matrix and physically encapsulated to separate them from air or other compositions present in the food system. This reduces the opportunity of oxidation or other chemical reaction of these core materials. When this colloid gel is injected or mixed into raw food system materials and processed in food production, the core materials are encapsulated in the gel matrix and separated from other food chemical components and additives. Heat processing temperatures may convert colloid gel matrix into liquid, however, the core materials are still surrounded by the polymer.

DETAILED DESCRIPTION OF THE INVENTION

A variety of flavor oils, oleoresin and spices can be encapsulated by the prescribed process. These materials include oleoresin of paprika, bay leaves, garlic, onion, black pepper, capsicum, ginger, basil, mace, rosemary, celery, thyme, nutmeg, anise and sage. Other oil flavors such as pimento, cardamom, cassia, garlic, black pepper, fennel, clove, dillweed, sage, clove leaves, lemon oil, nutmeg, cinnamon, winter green, peppermint, and bay may be used. Synthetic and natural flavor can also be used. These include vanilla, lemon oil, orange oil, grapefruit, lime, apple, pear, peach, strawberry, cherry, and the like. The above oils, oleoresin, synthetic and natural flavors may be used individually or in a mixture as is well known in the art.

The method of the present invention is typically practiced by first forming a colloid gel by dissolving selected gelatin in water in an appropriate temperature. This temperature is usually determined by the gelling temperature of the selected gelatin or other polymers. The mixture is mixed with a high sheer mixer such as Breddo Likwifier (American Ingredients Co., 550 South 18th St., Kansas City, Kans. 66105–1104) to dissolve the gelatin completely. This mixture turns into a very viscous gel. Oleoresin or flavor oil is added while the gel is being mixed. Mixing is continued until the core materials are thoroughly dispersed uniformly in the gel matrix. In some situations, the colloid gel may need two or more gelling polymers to obtain the desired properties of the gel matrix. The oleoresin or flavor oil stays in the gel matrix with reasonable stability due to the character of the gel matrix and the hydrophobic and hydrophilic nature of oleoresin and gel polymers. This colloidal gel matrix can be used in the gel form and injected or otherwise mixed into meat products. Gels formed by the practice of the present invention can also be frozen or cooked and frozen. This will turn the gel into a hard gel. Oleoresin and flavor oil are encapsulated in the gel matrix. They can be ground and mixed into the food product.

In the preparation of liquid spice which is useful in the practice of the present invention, a colloid gel is formed first by dissolving polymers, such as gelatin and other appropriate gum materials, in the water. The mixture is mixed with a high shear mixer such as Breddo Likwifier (American Ingredients Co., 550 South 18th St., Kansas City, Kans. 66105–1104) to form a viscous gel. Finely subdivided spices are added while the mixture is mixed by the Breddo Likwifier high shear mixer until the spice particles are dispersed uniformly in the gel matrix. Water soluble food ingredients can be added into the mixture, however, care should be exercised in the addition to avoid changing the gelling property of the gel. The liquid spices have no phase separation and can be pumped directly into a mixer, injector, or tumbler for food production.

The colloid gel matrix prepared as described herein with encapsulated flavors, oleoresin and spices can be employed in a variety of the processed meat, poultry, turkey and other food products. One example is to apply this technology in the injected large muscle meat products, such as roast beef, ham and turkey breast. Preferably, the flavor and spices are encapsulated in the colloid gel matrix in a very small globule form before contacting the meat. There should be no phase separation of the flavors and other spices in the solution before use. After the colloid gel matrix is injected into the muscle, the encapsulated core materials are distributed uniformly in the muscle and retain the colloid gel matrix. When the products are cooked, fat soluble flavor compounds are retained by the hydrophilic property of the colloid gel.

EXAMPLES OF FOOD APPLICATIONS FOR MATRIX GEL ENCAPSULATED PRODUCTS

Example 1. Gelatin (0.5 Kg) is dissolved in 9.5 Kg of water at temperature 15° C. and mixed by a high shear mixer for 15 minutes or until it is completely dissolved. The solution will become very viscous. Oleoresin of paprika 0.1 Kg is added while the gel matrix is being continuously mixed by the high shear mixer described herein. Mixing is continued until the oleoresin of paprika is completely dispersed into the gel matrix. The product formed is uniform in color with no phase separation of oleoresin from the gel matrix after about three hours. This oleoresin gel matrix, (0.5 Kg) is added into meat emulsion, (45.5 Kg) for frank production. The oleoresin of paprika is distributed uniformly in the chopper.

Example 2. Gelatin (0.4 Kg) is dissolved in 9.1 Kg of water at temperature 15° C. and mixed by a high shear mixer for 15 minutes or until it is completely dissolved. Carrageenan (0.3 Kg) is added while the gel is continuously mixed. At this point, the gel matrix becomes very viscous. Commercial beef flavor, (0.2 Kg), formulated with tallow is added and is mixed until the flavor is uniformly distributed. This product is cooked at 90° C. in a sealed kettle while mixing. The product is cooled to 60° C., packaged and stored at 4° C. until temperature equilibrated. One week later, product has uniform beef flavor distribution. One kilogram of this matrix gel is ground through ¼ inch plate, mixed with 9 Kg. of ground beef and formed into the patty. Product has good beef flavor notes with juicier texture and typical beef patty appearance.

Example 3. Trisodium phosphate 0.5 Kg is dissolved in 41.1 Kg of water at 15° C. Gelatin 1.5 Kg is added and mixed by a high shear mixer for 15 minutes or until it is completely dissolved. Carrageenan (1 Kg) is added while the gel is mixed continuously. At this point, the gel matrix becomes viscous but remains pumpable. Oleoresin black pepper 10 grams, garlic oil 1 gram, and lemon oil 1 gram are added and dispersed completely in the matrix gel, salt (2.8 Kg) and dextrose (3.1 Kg) are added and mixed with a high shear mixer for 5 minutes or until all the ingredients are completely dispersed. There is no phase separation of oleoresin over three hours and the gel matrix is pumpable. The matrix gel is used as a pickle solution and pumped into turkey breasts at 30% pump, tumbled for 2 hours until the meat is tacky. It is then packaged in water impermeable casing and steam cooked to an internal temperature of 74° C. The product has a typical turkey breast flavor note and the flavor is uniformly distributed in the breast.

Example 4. The formulation of matrix gel for this example is the same as Example 3. Turkey breast meat is replaced with turkey trim and it is ground with 2 inch plate. Thirty kilograms of the ground turkey trim are mixed with 9 Kg of pumpable gel matrix in the mixer and mixed for 45 minutes. The emulsion is stuffed into water impermeable casing and steam cooked. The finished product has the same appearance as typical restructured turkey breast product and the flavor is uniformly distributed.

Example 5. The formulation of matrix gel for this example is the same as Example 3. A chicken breast is first injected with matrix gel to obtain 30% pump, tumbled for 20 minutes and vacuum packaged individually in a plastic bag. The product is stored in 4° C. for one week. Product has no significant purge in the package. After cooling, the product has uniform and clean flavor without any rancid flavor note.

Example 6. Gelatin 0.2 Kg is mixed by a high shear mixer in 11 Kg of 4 C water until it is completely dissolved. Modified corn starch, 0.5 Kg is added and mixed thoroughly. The gel matrix is moderately viscous at this moment. A commercial frank seasoning 2.05 Kg and 1 Kg of salt are mixed into the gel matrix until they are uniform. This gel matrix has a consistency that is pumpable. Thirty-five Kilograms of nitrite cured meat with fat content of 36.6% is mixed with the gel matrix (14.75 Kg), and 1 Kg of corn syrup in a chopper and chopped for 3 minutes. The emulsion is emulsified through 1.2 mm plate and stuffed into cellulose casing. The product is cooked by a commercial process and chilled to 4° C. After four week's storage in 4° C. the product is cooked and evaluated. Product has good texture, uniform flavor and taste like newly made products.

In view of the above detailed description, other variations will become apparent to a person of ordinary skill in the art and such are within the scope of this invention.

We claim:

1. A method for preparing a uniform suspension of an encapsulated flavor oil, oleoresin or spice liquified in a gel matrix comprising:

forming a gel matrix by high shear mixing a colloidal gelling agent in water for a sufficient time at a temperature of about 15° C. to form a gel matrix;

dispersing said flavor oils, oleoresin or spices into said gel matrix during mixing to thereby form a stable gel matrix structure containing microencapsulated flavor oils, oleoresin or spices.

2. The method of claim 1 wherein the microencapsulation of flavor oil, oleoresin or spice contains about 40% by weight of oil.

3. The method of claim 1 wherein the colloidal gelling agent is selected from the group consisting of gelatin, carboxymethylcellulose, gum arabic, casein, modified starch, alginate, carrageenan and mixtures thereof.

4. The method of claim 1 including the step of adding food ingredients that are water soluble into the gel matrix after the oil soluble ingredients are microencapsulated in the gel matrix.

5. A method of treating food products comprising the steps of:

forming a gel matrix by high shear mixing of a colloidal gelling agent in water at a temperature of about 15° C. for a sufficient time to form a stable gel matrix;

encapsulating one or more of a group of food additive ingredients selected from the group consisting of flavor oils, oleoresin, spices or mixtures thereof by addition of the selected ingredients with mixing to said gel matrix and then contacting said gel matrix into food products.

6. The method of treating food products of claim 5 wherein the contacting of the food product with the matrix is accomplished by mixing, injection, marinating, tumbling or coating.

7. A method of making liquid spices that are pumpable and can be incorporated into food products comprising the steps of forming a gel matrix by high shear mixing of a colloidal gelling agent in water at a temperature of about 15° C. so as to form a stable gel matrix, and then encapsulating subdivided spices by the addition of the subdivided spices to the gel matrix during mixing.

* * * * *